United States Patent [19]

Winkler

[11] Patent Number: 4,511,345
[45] Date of Patent: Apr. 16, 1985

[54] CONSTANT SPEED JOINT ASSEMBLY

[75] Inventor: Otmar Winkler, Schweinfurt, Fed. Rep. of Germany

[73] Assignee: SKF Kugellagerfabriken GmbH, Schweinfurt, Fed. Rep. of Germany

[21] Appl. No.: 443,869

[22] Filed: Nov. 23, 1982

[30] Foreign Application Priority Data

Dec. 8, 1981 [DE] Fed. Rep. of Germany ....... 3148489

[51] Int. Cl.³ .............................................. F16D 3/30
[52] U.S. Cl. .................................. 464/145; 464/111; 464/143; 464/146
[58] Field of Search ................ 464/111, 112, 139–146, 464/906

[56] References Cited

U.S. PATENT DOCUMENTS

| 1,665,280 | 4/1928 | Rzeppa | 464/145 |
| 1,947,046 | 2/1934 | Hoffman | 464/145 |
| 1,975,758 | 10/1934 | Stuber | 464/145 |
| 4,012,924 | 3/1977 | Krude | 464/146 |
| 4,156,353 | 5/1979 | Welschof | 464/145 |
| 4,188,803 | 2/1980 | Otsuka et al. | 464/145 |

Primary Examiner—John Petrakes
Attorney, Agent, or Firm—Eugene E. Renz, Jr.

[57] ABSTRACT

Constant speed joint assembly comprising an inner joint body member, an outer joint body member and at least two rolling elements arranged therebetween capable of transmitting a torque which engage in an inner arcuate groove in the inner joint body member curved in a longitudinal direction about a center of curvature lying on the axis of rotation of the inner joint body member and in an outer groove in the outer joint body member lying radially opposite the inner joint body member curved in a longitudinal direction about a center of curvature offset in a longitudinal direction on the axis of rotation of the outer joint body member in relation to the radius of curvature of the mating inner groove and control means maintaining the rolling elements in a plane bisecting the angle between the axes of rotation during angular movement of the axes of rotation of the two joint body members, said inner joint body member having a centric cavity, said control means comprising a control body mounted in said cavity having at least two control arms engaging through said inner groove and adapted to maintain and coact with the rolling elements to maintain the same in said bisecting plane.

10 Claims, 9 Drawing Figures

CONSTANT SPEED JOINT ASSEMBLY

BACKGROUND AND SUMMARY OF THE INVENTION

The present invention relates to a constant speed universal joint comprising inner and outer complementary body members, rolling elements between the body members adapted for transmitting torque from one member to the other.

Constant speed joints of the above type are not new per se as illustrated for example in U.S. Pat. No. 1,975,758. In the embodiment illustrated in FIGS. 8 and 9 of this prior patent, a control disk is provided having axial retaining fingers incorporated between the inner and outer joint body members which serves to guide the spherical rolling elements on one longitudinal side and maintains them in a plane bisecting the angle between the axes of rotation of the two joint body members. This prior known constant speed joint has several disadvantages and drawbacks. For example, since the rolling elements are slidably guided on only one longitudinal side in the bisecting plane, a sliding guide is therefore lacking on the other side of the two longitudinal sides and as a consequence the rolling elements are not always maintained precisely in the bisecting plane and controlled. Accordingly, as a result of this lack of guidance under certain operating conditions, the rolling elements produce additional parasitic forces between the inner and outer joint body members which are not desirable. A further disadvantage resides in the fact that the retaining disk between the inner and outer joint body members must be assembled in such a way that it restricts the space for the rolling elements and thus the ability within a given sized joint to use the large maximum load bearing rolling elements is sacrificed. Additionally, the retaining fingers which engage axially in the inner and outer grooves of the inner and outer joint body members are subjected to bending stresses and it has been observed that they tend to break off during extreme operations under high loads.

In accordance with the embodiment shown in FIGS. 1 and 2 of prior U.S. Pat. No. 1,975,758, a cage instead of a retaining disk is inserted between the inner and outer body members to maintain the rolling elements in the bisecting plane. This cage occupies a relatively large space measured in a radial direction between the joint body members. Consequently, it is necessary to insert relatively large rolling elements between the inner and outer joint body members so that they protrude from the pockets of the cage and can engage in the inner and outer grooves of the joint body respectively for torque transmission. Thus, this modified constant speed joint is of relatively large construction and is for the most part capable of only assuming relatively low torque loads.

With the foregoing in mind, it is an object of the present invention to provide a constant speed joint characterized by novel features of construction and arrangement which overcomes the drawbacks of the prior art noted above. To this end, the inner body member has a centric cavity and each inner groove penetrates the cavity in the form of a radial slit and wherein the control means are provided in the form of a member mounted in the cavity having control arms engaging radially from inside to outside through an inner groove maintaining the mating rolling elements of the inner groove in the bisecting plane. By this construction, the joint assembly is of a very compact construction which is capable of accommodating high torque loads without damage and which additionally ensures trouble-free guidance of the rolling elements in the plane bisecting the angle between the axes of rotation.

In the preferred embodiment of the invention, the control arms of the control member are constructed as pins lying in the bisecting plane and the rolling elements have radial bores therein to receive the pins providing for free rotating support of the rolling elements. This arrangement provides an extremely compact construction wherein the control means do not occupy any space at all at the longitudinal side of the rolling elements. By reason of this, the rolling elements can roll in the inner and outer grooves without lateral restriction by the control means when the axes of rotation of the two joint body members are mutually displaced. In this manner, a greater bending angle of the axis of rotation in the inner joint body member in relation to the axis of rotation of the outer joint body member can be permitted in the constant speed universal joint.

The control arms are preferably provided on both longitudinal sides of the mating rolling element with a retaining finger slidably supporting the rolling elements. By this arrangement, the rolling elements are held at both longitudinal ends by the retaining fingers of the control arm and guided in the bisecting plane.

In accordance with another feature of the present invention, a spherical cup having a convex curved outer surface which is ductile under elastic pressure in a longitudinal direction is positioned opposite and closely fitted to one of the support surfaces of the cavity in the control body. In this manner, the control body can perform rotating and swivelling movements as well as shift itself slightly as the result of pressure in the longitudinal direction against the elastic ductile outer surface. This, facilitates assembly of the control body and the rolling elements in the inner and outer universal joint body members. Furthermore, by this arrangement, it is possible during operation for the control body to make small relative adjusting movements in the constant speed universal joint so that jamming of the control body between the two joint body members is obviated.

In accordance with still another more specific feature of the invention, the inner and outer joint body members are provided with four complementary grooves wherein the center of curvature of one pair of diametrically opposed outer grooves is arranged on one side and the center of curvature of the mating pair of inner grooves is arranged on the other side of the bisecting plane and the center of curvature of the other pair of diametrically opposed grooves in relation to the center of curvature of its mating pair of inner grooves is arranged at opposite sides of the bisecting plane. By this arrangement, the longitudinal thrust of one pair of diametrically opposed rolling elements produced by a torque load is at least partly compensated by the longitudinal thrust of the other pair of diametrically opposed rolling elements of the universal joint which acts in the opposite direction. In this manner, relatively low longitudinal forces, that is, thrust forces in the direction of the axes of rotation, are formed at the joint rolling elements so that an extremely quiet, vibration-free running of the constant speed universal joint with low running friction of the rolling elements is obtained. There is another advantage to this arrangement in that the joint in the assembled relation is self-retaining. For example, the inner joint body member is fixed against slipping out to the other side in the outer joint body member by the two diametrically opposed rolling elements of the two outer grooves, the center of curvature which lies on the one side of the bisecting plane. Similarly, the inner joint body member is held in place longitudinally in the outer joint body member by the rolling elements in the two other diametrically opposed outer grooves which have their center of curvature on the other side of the bisecting plane.

A further specific characteristic of the present invention resides in the bisecting plane being arranged to bisect the connecting line through the two centers of curvature of the inner and outer grooves in the center between these two centers of curvature thus providing a simple side-to-side symmetrical construction of the inner and outer grooves in the inner or outer joint bodies respectively. This arrangement coupled with the spherical cup having a convex ductile outer surface results in balancing of the longitudinal forces produced by the rolling elements in the inner and outer grooves so that they compensate each other completely. Furthermore, because of this a relatively low longitudinal thrust is exerted on the two joint body members by the rolling elements during a torque load so that the two joint body members can be held in place securely by relatively simple means on their driving elements or machine shaft.

In accordance with another specific feature of the constant speed universal joint, the outer joint body member is formed with a spherical concave inner surface and the inner joint body has a spherical convex outer surface which is slidably and angularly movable in the inner joint body member whereby the two complementary spherical surfaces have a common sphere center which coincides with a point of intersection of the connecting line through the two centers of curvature of the inner and outer grooves with the bisecting plane. By this arrangement the inner joint body member is slidably guided centrically and angularly movable with its spherical convex outer surface on the spherical convex inner surface of the outer joint body. Thus the outer surface may be constructed in such a way that the mating inner surface is grasped and the inner joint body member is held in place in the outer joint body member on both longitudinal sides. In this case, therefore, centering forces as well as longitudinal forces of the rolling elements are not only transmitted via the inner and outer grooves of the joint bodies but also via the inner and outer surface of the inner and outer joint bodies respectively. In particular cases, the rolling elements can be completely relieved of the radially directed centering forces between the inner and outer joint bodies and the rolling elements then only take up the forces between the inner and outer joint bodies acting in a peripheral direction and caused by the torque.

In order to simplify machining and assembling of the joint, the surface of the rolling elements engaging in the inner grooves of the inner joint body and in the outer grooves of the outer joint body are of a spherical configuration and the grooves closely fit or complement the cross sectional shape of the rolling elements.

DESCRIPTION OF THE DRAWINGS

These and other objects of the present invention and the various features and details of the operation and construction thereof are hereinafter more fully set forth with reference to the accompanying drawings wherein.

DESCRIPTION OF THE PREFERRED EMBODIMENTS

Figure 1:
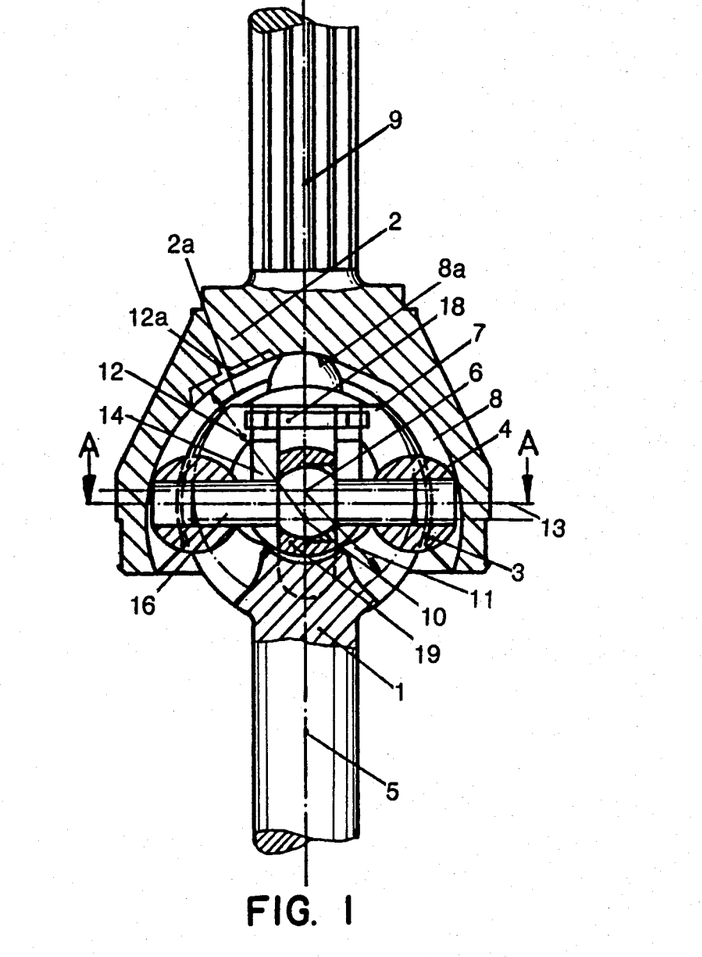
FIG. 1 shows a longitudinal section through a constant speed universal joint in the aligned straight condition of the two axes of rotation of the inner and outer joint bodies.

Referring now to the drawings and particularly to FIG. 1 thereof, there is illustrated a constant speed universal joint assembly in accordance with the present invention comprising, as illustrated, inner and outer joint body members 1 and 2 respectively. The outer body member 2 is of generally cup-shaped configuration and the inner body member 1 nests in the cavity formed in the cup-like outer body member. Rolling elements 3 which in the present instance have spherically shaped outer surfaces 4 are distributed uniformly along the periphery. FIG. 1, is a cross section of the constant speed universal joint assembly through one set of the rolling elements 3, which lie diametrically opposite each other. In order to transmit a moment of rotation, the two diametrically opposed rolling elements 3 engage in an inner arcuate groove 7 of the inner joint body 1 running curved in a longitudinal direction relative to a center of curvature 6 lying on the axis of rotation 5 of the inner joint body member 1. At the same time, these two rolling elements 3 engage in an outer arcuate groove 8 formed in the outer joint body radially opposite the inner groove 7. This outer groove 8 similar to the inner groove 7 also runs in a longitudinal direction. However, the groove 8 is curved around a center of curvature 10 lying on the axis of rotation of the outer joint body member 2 which center of curvature 10 is offset in a longitudinal direction in relation to the center of curvature 6. The inner and outer grooves 7 and 8 are of circular cross sectional shape to closely match the spherical shape of rolling elements 3. In this manner the two rolling elements 3 are guided tolerance-free between the mating inner groove 7 with a radius of curvature 11 about the center of curvature 6 and the mating outer groove 8 with the radius of curvature 12 about the center of curvature 10. In this instance the rolling elements 3 also assume the radial centering of the inner joint body member 1 in the outer joint body member 2. When the parts of the universal joint assembly are as shown in FIG. 1, the axes 5 and 9 of the joint body members 1 and 2 are aligned in a straight line. The two axes of rotation 5 and 9, therefore, form an angle of 180°. The plane bisecting this angle lies perpendicular to the two axes of rotation 5 and 9. As illustrated, it runs in the middle of the center of curvature 10 of the outer groove 8 and the center of curvature 6 of the inner groove 7.

Figure 2:
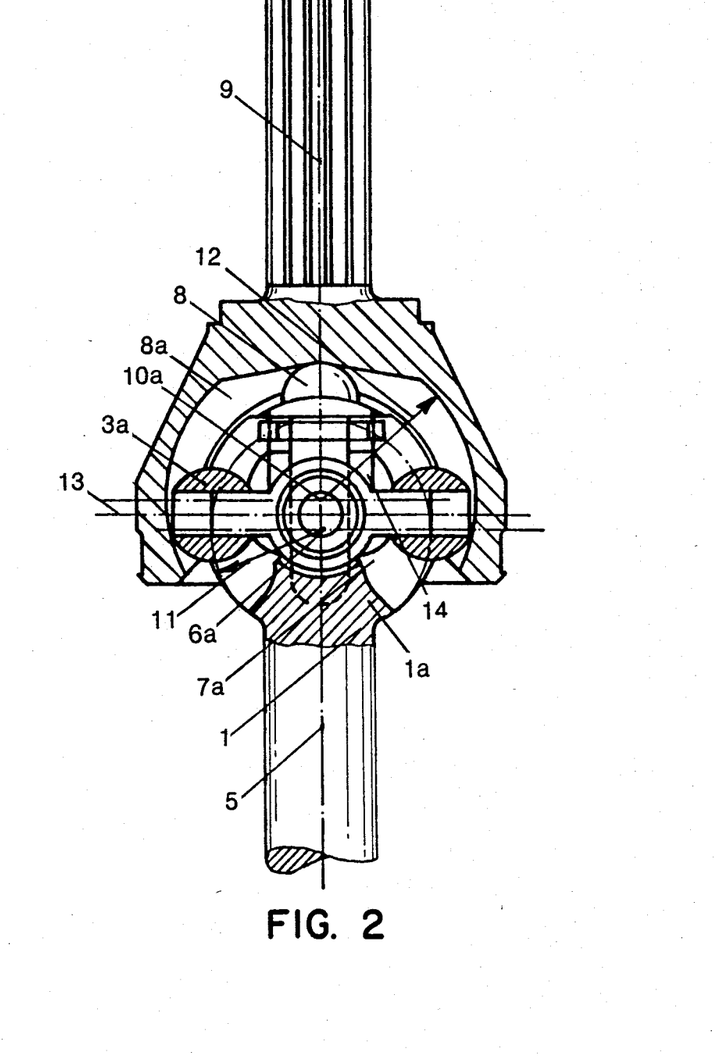
FIG. 2 shows a longitudinal section through the constant speed joint shown in FIG. 1, which runs perpendicular to the longitudinal section shown in FIG. 1.
Figure 3:
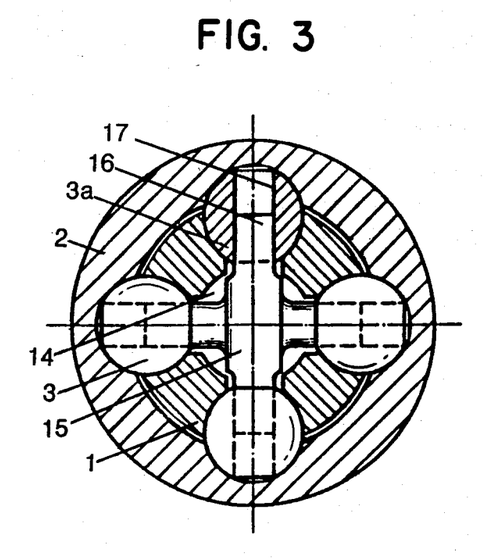
FIG. 3 shows a cross section along line A—A through the constant speed joint shown in FIG. 2.

FIG. 2 is the longitudinal section taken in a plane perpendicular to that illustrated in FIG. 1 through the other two complementary rolling elements 3a which are likewise disposed diametrically opposite each other. As illustrated, both rolling elements 3a also engage in an inner arcuate groove 7a of the inner joint body member 1 extending curved in a longitudinal direction and in an arcuate outer groove 8a of the outer joint body member 2 running radially opposite joint body member 1. In this instance, the two centers of curvature 6a and 10a of the inner and outer grooves 7a and 8a are offset from each other in a reversed order to the grooves 7 and 8 for the rolling elements 3. The center of curvature 10a of the two diametrically opposed outer grooves 8a is arranged on the bisecting plane 13 (upperside in the drawing) and center of curvature 6a of the mating inner grooves 7a on the opposite lower side of the bisecting plane 13. However, the radii of curvature 12 of the four outer grooves 8, 8a as well as the radii of curvature 11 of the four inner grooves 7, 7a of the joint body members 1 and 2 are of precisely the same size.

Figure 4:
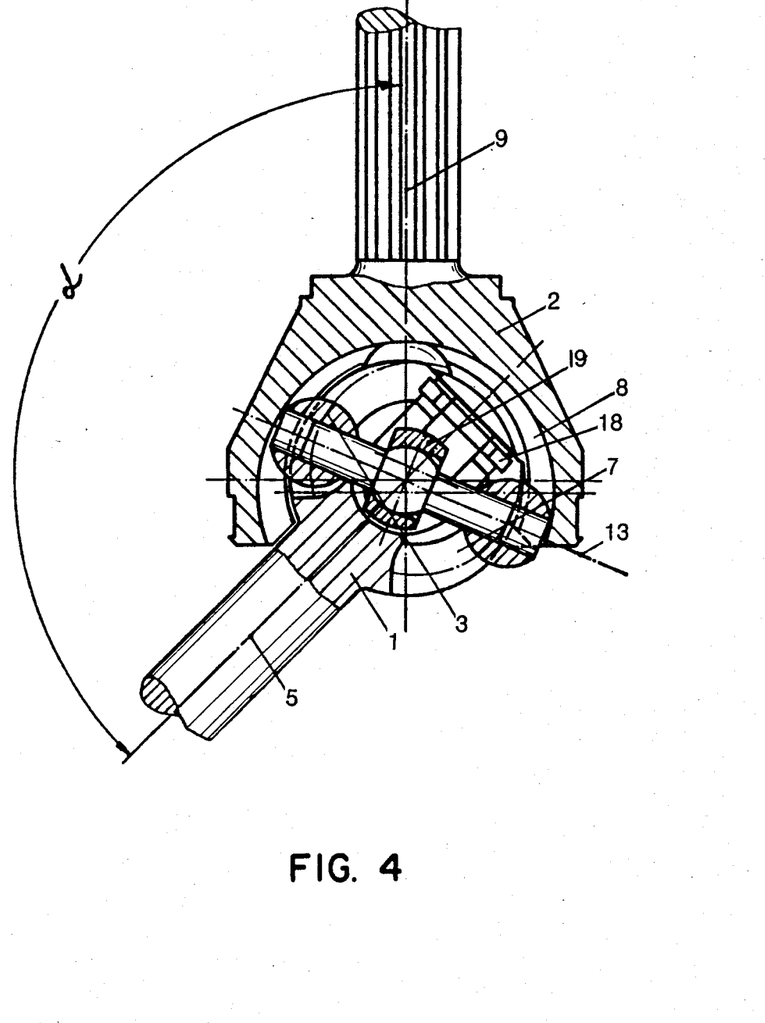
FIG. 4 shows a longitudinal section through the constant speed joint shown in FIG. 1 but with the axes of rotation of the inner and outer joint bodies directed at an angle to each other.

The spherical head 1a of the inner joint body member 1 has a one-sided open centric cavity 14. As illustrated, each of the inner grooves 7, 7a of this joint body member extend radially to communicate with the cavity 14 so that the grooves are in the form of slits therein. Control means are provided in the cavity 14 which maintain the rolling elements 3, 3a in the plane 13, which bisects the angle α between the two axes of rotation 5 and 9 even when an opposite angular movement of the axes of rotation 5 and 9 of the two joint body members 1 and 2 takes place as illustrated in FIG. 4. The control means as illustrated comprises a central body or hub member 15 and a plurality of radial control arms in the form of pins 16 which engage through the inner grooves 7, 7a. The control arms lie inside the bisecting plane 13 and engage in a cylindrical bore 17 extending radially through the rolling elements 3, 3a. In this manner the rolling element can slide on the pin 16 and freely rotate and shift along the pin in a radial direction and at the same time be held in the bisecting plane 13 by the pin 16. The open end of the cavity 14 parallel to its longitudinal axis is closed off by a welded sheet metal cap 18. The control body 15 is as illustrated constructed spherically convex at its opposite ends and at that location held in place by a corresponding spherically concave angularly movable spacer 19 and held with tolerance in the interim space between the sheet metal cap 18 and the wall of the cavity 14 located opposite it in a lengthwise direction.

Considering now assembly of the constant speed universal joint described above, initially the control body 15 and spacer 19 are inserted in the cavity of the inner joint body member 1 so that each pin 16 engages through an inner groove 7, 7a thereof. Then the sheet metal cap 18 is positioned in an annular groove in the cavity 14 and welded to the inner joint body member 1. Next, the inner joint body member is assembled and the control body 15 inserted into the outer joint body member 2 in the direction of the axis of rotation 9. With reference to FIG. 1 therefore, the inner joint body member 1 and associated elements are pushed in from the bottom upward. In this case the inner joint body member 1 is shifted axially inward into the cavity formed in the outer joint body 2 until the leading surface of the control body 15 engages in an axial recess 2a in the interior of the outer joint body member 2.

Each outer groove 8, 8a has an outer operating section with a radius of curvature 12 and an inner assembling section 12A offset radially outward in relation to the operating section and merging smoothly into it. The operating section and the assembly section 12A of each outer groove 8 are adjusted to each other in such a way that during engagement of the leading surface of the control body 15 in the axial recess in the interior of the outer joint body 2, the control body member 15 together with the rolling elements 3 are capable of being swivelled in the outer joint body member 2 independently of the bending angle a of the axes of rotation 5 and 9 as illustrated in FIG. 4.

The diametrically opposed rolling elements 3a shown in FIG. 2 run in an outer groove 8a wherein the center of curvature 10a is arranged at the side of the bisecting plane 13 which is offset inwardly in relation to the open side of the outer joint body member 12. By reason of this arrangement, the mutual distance of the two diametrically opposed outer grooves 8a narrows at the open end of the outer joint body member 2 and therefore the inner joint body member 1 is prevented from being displaced or pulled out axially from the outer joint body 2 by the rolling elements 3a.

Figure 5:
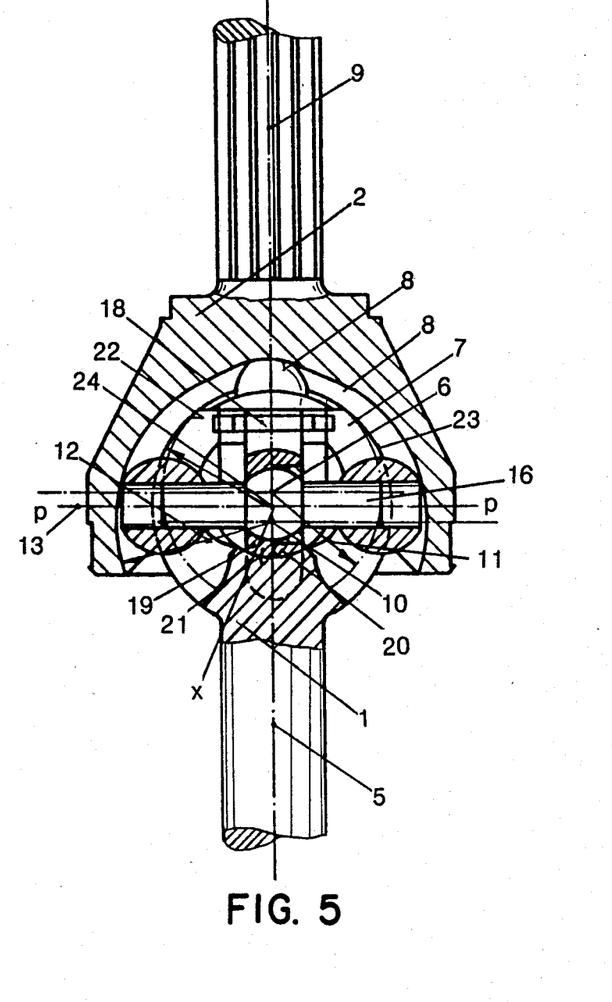
FIG. 5 shows a longitudinal section through a modified constant speed joint with the axes of rotation of the inner and outer constant speed joint aligned in a straight line to each other.

There is illustrated in FIG. 5 a modified constant speed universal joint in accordance with the present invention. The overall arrangement of this assembly is generally similar to that described above and therefore comprises an inner joint body member 1 having a spherical head portion 1a which engages in a concave cavity 2a in the outer joint body 2 and four rolling elements arranged in diametrically opposed pairs 3, 3. The assembly further includes a control body member 15 engaging in a cavity 14 of the inner joint body member 1. The control body 15 has radially extending pins 16 which project through the inner grooves 7 of the inner joint body 1. The four pins 16 of the control body which lie in a common plane P—P support the rolling elements 3,3, in the plane 13 bisecting the angle between the axes of rotation 5 and 9. A sheet metal cap 18 is fastened to the inner joint body member 1.

In accordance with this embodiment of the invention, the center of gravity of all four outer grooves 8 is arranged on the low side of the bisecting plane 13. The low side therefore lies in front of the bisecting plane 13 as seen from the open end of the outer body joint member 2. By this arrangement, a force component is exerted by the rolling elements 3, on the pins 16 under a torque load which urges the control body 15 in the direction of the axis of rotation 5, this direction in the drawing being from top to bottom so that the spacer 19 engages against the concave curved lower support surface 20 of the inner joint body member 1. The control body 15 is slidably connected via its centrically arranged spherical convex surface with a spherical concave inner surface of the spacer 19 so that it can move at an angle. Spacer 19 in turn is slidably supported at its outer surface 21 on the concave curved support surface 20 of the inner joint body member 1.

In accordance with this embodiment of the invention, the outer joint body 2 has a spherical concave inner surface 22 and the inner joint body member has a complementary fitting outer surface 23 which slides on the inner surface 22 and is thus of a spherical convex shape. The complementary surfaces 22 and 23 have a common sphere center X so that the inner body joint member 1 can move at an angle and is held locked in the outer joint body member 2 against axial displacement relative thereto. This common sphere center X coincides with the intersecting point 24 of the connecting line through the two centers of curvatures 6 and 10 with the bisecting plane 13 even when the axis of rotation 5 and 9 are at a mutually angular position.

When assembling the inner joint body 1 in the outer joint body 2, first the inner joint body 1 is provided with the control body 15. At that time, the control body 15 is turned into the inner joint body 1 and finally shifted so that the inner joint body 1 can be inserted axially into the outer joint body 2. Next, the cross pieces located between the inside grooves 7 of the inner joint body 1 are made to engage with the outer groove 8 of the outer joint body 2 by longitudinally inserting the inner joint body 1 into the outer joint body 2. The inner joint body 1 is longitudinally inserted further into the outer joint body 2. The inner joint body 1 is then twisted slightly so that its inner grooves 7 radially lie opposite the outer grooves 8 of the outer joint body 2. The control body 15 is charged with the roller bodies 3 by inserting them between the appropriate inner and outer grooves 7, 8. With this assembly, a constant speed joint is provided which is assembled self-locking.

Figure 6:
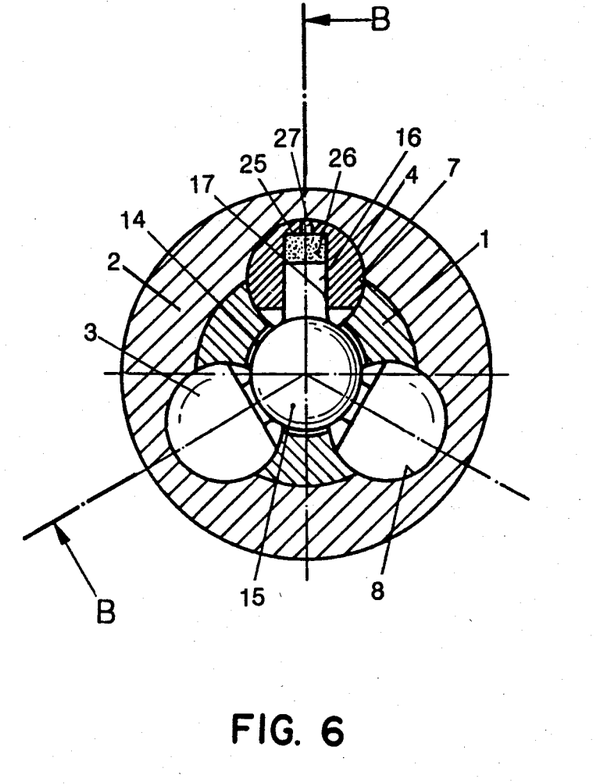
FIG. 6 shows a cross section through a further modified constant speed joint having three roller bodies in its interior.
Figure 7:
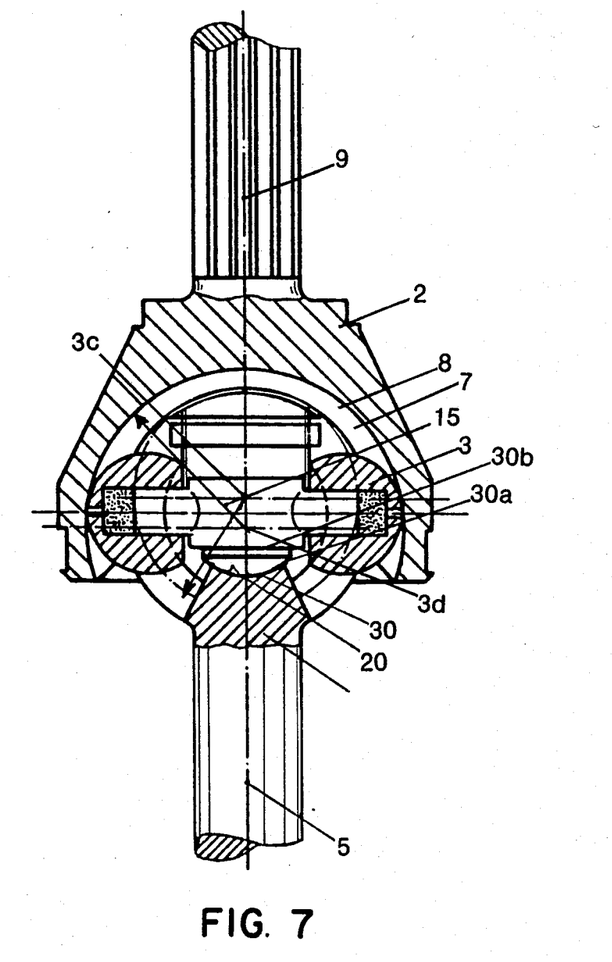
FIG. 7 shows a longitudinal section along line B—B through the constant speed joint shown in FIG. 6.

FIGS. 6 and 7 illustrate another embodiment of constant speed universal joint in accordance with the present invention. In accordance with this embodiment of the invention, only three spherical rolling elements 3b are utilized which are distributed uniformally about the periphery in the manner illustrated. Each rolling element 3b tracks or runs in a curved inner groove 7 in the inner joint body, which grooves extend in a longitudinal direction about a center of curvature 3c lying on the axis of rotation 5 of the inner joint body 1. Each rolling element 3b runs in an arcuate outer groove 8 of the outer joint body member 2 which extends in a longitudinal direction about a center of curvature 3d lying on the axis of rotation 9 of the outer joint body member 2. The center curvature of the inner groove is as in the previously described embodiments offset in a longitudinal direction in relation to the center curvature of the outer groove 8. Further, as illustrated, the inner joint body member has a center cavity 14 and the inner grooves extend into the cavity and are therefore in the form of radial slits. The control means in this instance comprises a control body member 15 inserted in the cavity 14 and radially directed pins lying in the bisecting plane 13 each of which engages in an inner groove 7 of the inner joint body member 1 running radially from the inside to the outside.

In the present instance, the cylindrical bore 17 of each roller body 3b is stepped at its outer end to define an inwardly directed circumferentially extending shoulder 25 and between the shoulder 25 and the outer axial end face of each pin, a plug 26 is mounted which is made of an elastically compressible material which may consist of an open cellular foam plastic saturated with a lubricating oil. During operation, the compression plug 26 provides small amounts of lubricating oil to the sliding surfaces between the pins and the bore of the rolling elements as well as through a capillary bore 27 in the rolling elements to the sliding surfaces between the spherical surface 4 of the rolling elements 3 and the outer groove 8 of the outer body joint 2. Additionally, the compression plug 26 maintains the rolling elements in constant contact with the outer groove of the outer joint body and essentially free of play radially.

From FIG. 7 it is evident that a slidably supported spherical cap 30A is held on the control body 15 in cross direction to the transverse plane 30B of the control body 15. This spherical cap 30A in the present case is machined from an elastically compressible elastomer material. The spherical cup 30a has a spherically convex curved outer surface 30 facing downward in the drawing which is supported angularly movable by the corresponding spherical concave curved bottom support surface 20 of the inner joint body 1. The control body 15 during assembly of the constant speed joint as well as in operation may be slightly offset in relation to the axes of the rotation 5, 9. Because of the elasticity of its material of construction, the spherical cup 30A has an elastically ductile outer surface 30 in the longitudinal direction of the control body 15. The control body 15 is fixed free of play with axial pre-stress between the inner joint body 1 and the outer joint body 2. Because of a proper choice of the thickness of the spherical cup 30A in the longitudinal direction, the magnitude of this axial pre-stress can be adjusted.

Figure 8:
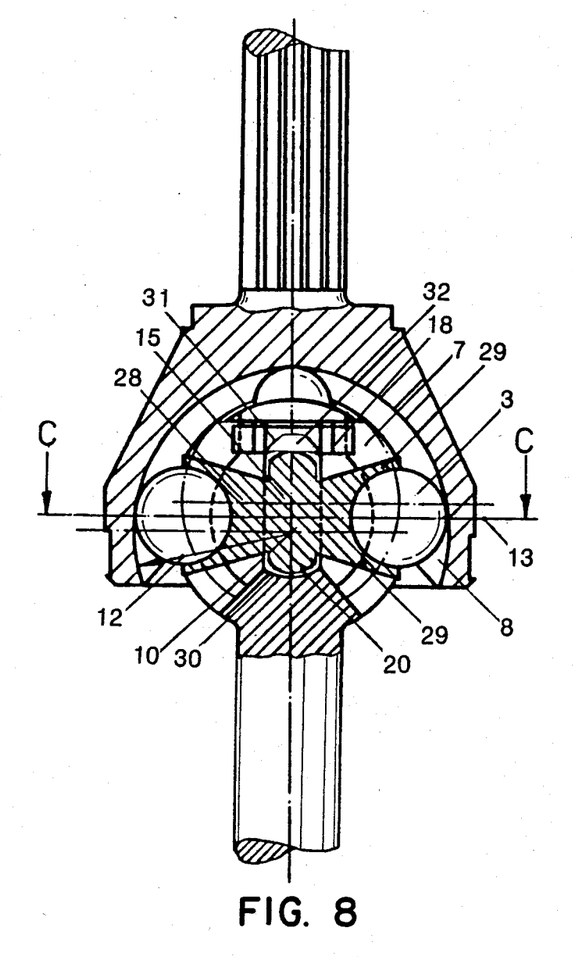
FIG. 8 shows a longitudinal section through a modified constant speed joint in which the roller bodies are guided by the retaining finger of the control arm of the control body engaging them in longitudinal direction.
Figure 9:
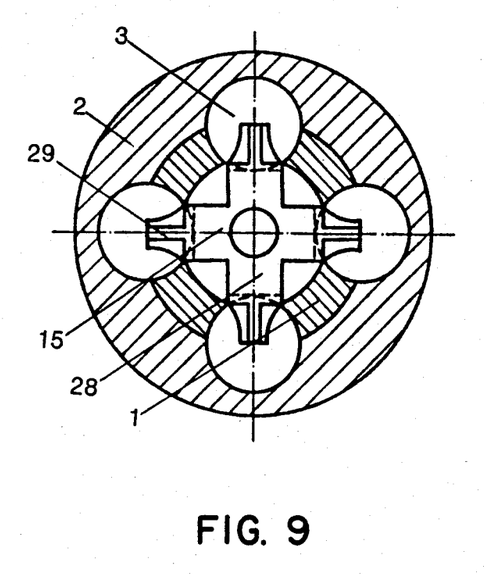
FIG. 9 shows a cross section along line C—C through the constant speed joint shown in FIG. 8.

FIGS. 8 and 9 illustrate a further modified constant speed universal joint in accordance with the present invention. The overall arrangement of the parts is generally similar to that previously described. However, in accordance with this embodiment, the rolling elements are solid, spherical balls without a bore. In order to accommodate rolling elements of this configuration, the control arms 28 of the control body 15 are each provided at their outer ends with a retaining finger configuration 29 providing a spherical cup like pocket to support the rolling bodies longitudinally and slidably maintaining them in the bisecting plane 13. As illustrated in FIG. 9, in accordance with this embodiment four balls 3 are provided which engage in transversely oriented arcuate grooves 7 in the outer joint body member and in complementary arcuate inner grooves 8 of the inner joint body member 1. The control body 15 has a centric longitudinal outer surface 30 facing downwardly which is supported in the direction of the axis of rotation 5 directly on the arcuate lower support surface 20 of the inner joint body member 1. The axial reaction force of the balls 3 is therefore transmitted from the outer surface 30 to the support surface 25 coming to the control body 15 via the control arms 28. These reaction forces must be taken up by the inner joint body member since the common center of curvature 6 of all the outer grooves 7 lies on the bisecting plane 13.

The centric position of the control body 15 in the cavity 14 is controlled automatically by the correspondingly concave shape of the curvature of the support surface 20 during mutual offsetting of the axes of rotation 5, 9. In that case, the control body 15 is also supported longitudinally and slidably guided on one of the upper support surfaces 31 which is curved convex and faces the lower support surface 20. The support surface 31 cooperates with the opposite concave slide surface of a support plate 32. The support plate 32 is held in place elastically cushioned, in other words, without play, in the sheet-metal cap 18, fastened to the inner joint body 1.

Even though particular embodiments of the invention have been illustrated and described herein, it is not intended to limit the invention and changes and modifications can be made therein within the scope of the claims. It is, for example, possible to insert two roller bodies or more than four roller bodies in the constant speed joint which are distributed uniformly along the periphery. The roller bodies after all need not be designed spherical. For a corresponding construction of the inner grooves of the inner joint body and the outer grooves of the outer joint body they could also rather have a barrel shape or cylindrical shape. Additionally, instead of a spherical cup 30A of elastically compressible material (see FIG. 7), a rigid spherical cup with an outer surface 30 can be inserted in the control body 15, which is held slidably in the control body 15 in longitudinal direction and pressed elastically ductile against the support surface 20 of the inner joint body 1 by compression springs. In that case, the outer surface 30 of the spherical cup is curved spherically convex and adapted carefully to the spherically convex support surface 20 of the inner joint body 1.

SUMMARY

A constant speed joint comprises an inner joint body (1), an outer joint body (2) fitting around it and at least two roller bodies (3) arranged between them and distributed uniformly along the periphery. The roller bodies (3) each engage in an inner groove (7) in the inner joint body (1) curved in longitudinal direction about a center of curvature lying on the axis of rotation (5) of the inner joint body (1) and in an outer groove 8 in the outer joint body (2), lying radially opposite the inner joint body (1), curved in longitudinal direction about a center of curvature (10) placed offset in longitudinal direction on the axis of rotation (9) of the outer joint body (2) in relation to the radius of curvature (6) of the mating inner groove (7).

In order to ensure that the constant speed joint is built compact and is capable of withstanding high torque stress without damage and furthermore is provided with trouble-free guiding of the roller bodies (3) in the plane (13) bisecting the angle between the two axes of rotation (5, 9), the inner joint body (1) has a centric cavity (14). Each inner groove (7) of the inner joint body (1) penetrates the cavity (14) in the form of a radial slit. The control means which for a mutual angular movement of the axes of rotation (5, 9) keep the roller bodies (3) in a plane (13) bisecting the angle between the axes of rotation (5, 9) are formed by a control body (15) inserted in the cavity (14), each of which has a control arm (16) engaging radially from inside to outside through an inner groove (7) keeping the mating roller bodies (3) of the inner groove (7) in the bisecting plane (13).

I claim:

1. Constant speed joint assembly comprising an outer joint body member having an axis of rotation and being of cup-like form defining an open chamber and an inner joint body member having an axis of rotation which nests in the chamber of the outer joint body member and at least two rolling elements arranged therebetween capable of transmitting a torque which engage in an inner arcuate groove in the inner joint body member curved in a longitudinal direction about a first center of curvature lying on the axis of rotation of the inner joint body member and in an outer groove in the outer joint body member lying radially opposite the inner joint body member and curved in a longitudinal direction about a second center of curvature offset in a longitudinal direction on the axis of rotation of the outer joint body member in relation to the radius of curvature of the mating inner groove and control means maintaining the rolling elements in a plane bisecting the angle between the axes of rotation of said joint body member during angular movement of the axes of rotation of the two joint body members, said inner joint body member having a centric cavity, said first and second centers of curvature being offset an equal distance on opposite side of said bisecting plane, said control means comprising a control body mounted in said cavity having at least two control arms rigidly connected to said control body, said control arms engaging through said inner groove and adapted to maintain and coact with the rolling elements to maintain the same in said bisecting plane.

2. A constant speed joint mechanism as claimed in claim 1 wherein said control arms comprise pins lying in the bisecting plane and each engaging through a bore in the rolling element for free rotating support thereof.

3. A constant speed joint assembly as claimed in claim 2 wherein each pin is of a smooth cylindrical shape and the rolling elements have corresponding cylindrically-shaped bores so that they are mounted for sliding displacement along said pins.

4. A constant speed joint assembly as claimed in claim 1 wherein said control arms on both longitudinal sides of the mating rolling elements are each provided with a retaining finger slidably supporting the rolling elements.

5. A constant speed joint assembly as claimed in claim 1 wherein said control body is slidably supported on a concave curved centric support surface of said cavity in the inner joint body member thereby to control its position in relation to the inner joint body member.

6. A constant speed joint assembly as claimed in claim 5 including a spherical cup having a convex curved outer surface which is ductile under elastic pressure in a longitudinal direction and which is positioned opposite and closely fitted to one of the support surfaces of said cavity in the control body and is supported thereon.

7. A constant speed joint assembly as claimed in claim 1 wherein four outer grooves are provided in the outer joint body member and four mating inner grooves in the inner joint body member and wherein the center of curvature of a first pair of diametrically opposed outer grooves is arranged on one side of said bisecting plane and the center of curvature of the mating pair of inner grooves is arranged on the other side of said bisecting plane and that the center of curvature of the second pair of diametrically opposed outer grooves in relation to the center of curvature of its mating pair of inner grooves is arranged at opposite sides of said bisecting plane.

8. A constant speed joint assembly as claimed in claim 1 wherein said bisecting plane is arranged to bisect a connecting line through the two centers of curvature of the inner and outer grooves in the center between these two centers of curvature.

9. A constant speed joint assembly as claimed in claim 1 wherein said outer joint body member has a spherical concave inner surface and said inner joint body member has a spherical convex outer surface which is slidably angularly movable in said inner joint body member, said complementary surfaces having a common sphere center which coincides with the point of intersection of the connecting line through the centers of curvature of the inner and outer grooves with said bisecting plane.

10. A constant speed joint assembly as claimed in claim 1 wherein the surface of the rolling elements engaging in the inner groove of the inner joint body member and the outer groove of the outer joint body member are spherical and the grooves are of a cross sectional shape to closely embrace the rolling elements.

* * * * *